(12) United States Patent
Long et al.

(10) Patent No.: US 12,291,996 B2
(45) Date of Patent: May 6, 2025

(54) ENERGY STORAGE SYSTEM HEATER CONTROL METHODS

(71) Applicant: Rolls-Royce Corporation, Indianapolis, IN (US)

(72) Inventors: Stephen Andrew Long, Indianapolis, IN (US); Michael Dougherty, Indianapolis, IN (US); Tomasz Marek Lubecki, Singapore (SG); Firman Sasongko, Singapore (SG); Chandana Jayampathi Gajanayake, Singapore (SG); Michael Adam Zagrodnik, Singapore (SG)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/891,872

(22) Filed: Aug. 19, 2022

(65) Prior Publication Data

US 2024/0011438 A1   Jan. 11, 2024

Related U.S. Application Data

(63) Continuation of application No. 17/860,895, filed on Jul. 8, 2022.

(51) Int. Cl.
*F02C 7/32* (2006.01)
*B64D 27/357* (2024.01)
(Continued)

(52) U.S. Cl.
CPC .............. *F02C 6/14* (2013.01); *B64D 27/357* (2024.01); *F02C 6/08* (2013.01); *F02C 7/32* (2013.01);
(Continued)

(58) Field of Classification Search
CPC . F02C 7/14; F02C 7/32; B64D 27/357; B64D 27/355; B64D 33/08
See application file for complete search history.

(56) References Cited

U.S. PATENT DOCUMENTS 10,906,658 B2    2/2021  Long et al.
2009/0280395 A1*  11/2009  Nemesh .............. H01M 10/615
                                                          429/62
(Continued)

FOREIGN PATENT DOCUMENTS

CN      101962000 B    8/2012
CN      103407346 B    3/2016
(Continued)

OTHER PUBLICATIONS

Office Action from U.S. Appl. No. 17/860,895 dated Nov. 7, 2023, p. 30.
(Continued)

*Primary Examiner* — Thuyhang N Nguyen
(74) *Attorney, Agent, or Firm* — Shumaker & Sieffert, P.A.

(57) ABSTRACT

Methods of controlling an in-line heater for an energy storage device are provided. A determination is made that a pump is running. When running, the pump circulates a thermal management fluid through a thermal management conditioning loop, which includes the in-line heater and a heat transfer hardware configured to transfer heat between the thermal management fluid and the energy storage device, wherein the in-line heater is in thermal communication with the thermal management fluid. The in-line heater is turned on in response to the determination that the pump is running and a temperature of the thermal management fluid is below a lower control limit.

18 Claims, 13 Drawing Sheets

(51) Int. Cl.
*F02C 6/08* (2006.01)
*F02C 6/14* (2006.01)

(52) U.S. Cl.
CPC .. *F05D 2220/323* (2013.01); *F05D 2260/213* (2013.01); *F05D 2260/232* (2013.01); *F05D 2260/42* (2013.01); *F05D 2260/606* (2013.01); *F05D 2270/303* (2013.01)

(56) References Cited

U.S. PATENT DOCUMENTS

| | | | |
|---|---|---|---|
| 2012/0295141 A1* | 11/2012 | Allen | H01M 10/615 429/62 |
| 2013/0286526 A1* | 10/2013 | Satoh | B60H 1/2221 903/903 |
| 2014/0216709 A1* | 8/2014 | Smith | B60H 1/00278 165/41 |
| 2016/0229282 A1* | 8/2016 | Hettrich | B60L 58/24 |
| 2016/0298883 A1* | 10/2016 | Louvar | H05K 7/20827 |
| 2019/0173140 A1* | 6/2019 | Yokote | F04D 29/661 |
| 2020/0023751 A1* | 1/2020 | Seo | H01M 10/6568 |
| 2020/0031193 A1* | 1/2020 | Lee | H01M 10/6567 |
| 2020/0215931 A1* | 7/2020 | Ogaki | B60L 58/12 |
| 2020/0303789 A1 | 9/2020 | Macdonald et al. | |
| 2021/0138868 A1* | 5/2021 | Bruneau | H01M 10/615 |
| 2021/0162884 A1 | 6/2021 | Villanueva et al. | |
| 2022/0106053 A1 | 4/2022 | Snyder | |
| 2024/0011437 A1 | 1/2024 | Long et al. | |
| 2024/0011438 A1 | 1/2024 | Long et al. | |

FOREIGN PATENT DOCUMENTS

| | | |
|---|---|---|
| EP | 2804188 B1 | 12/2018 |
| EP | 3480114 B1 | 3/2020 |
| WO | 2006014307 A1 | 2/2006 |
| WO | 2021041209 A1 | 3/2021 |

OTHER PUBLICATIONS

Response to Office Action dated Nov. 7, 2023 from U.S. Appl. No. 17/860,895, filed Feb. 7, 2024, 12 pp.

Advisory Action from U.S. Appl. No. 17/860,895 dated Aug. 14, 2024, 5 pp.

Final Office Action from U.S. Appl. No. 17/860,895 dated May 16, 2024, 20 pp.

Response to Final Office Action dated May 16, 2024 from U.S. Appl. No. 17/860,895, filed Jul. 16, 2024, 11 pp.

Office Action from U.S. Appl. No. 17/860,895 dated Sep. 20, 2024, 23 pp.

Response to Office Action dated Sep. 20, 2024 from U.S. Appl. No. 17/860,895, filed Dec. 20, 2024, 11 pp.

* cited by examiner

ENERGY STORAGE SYSTEM HEATER CONTROL METHODS

CROSS-REFERENCE TO RELATED APPLICATIONS

This application is a continuation of U.S. patent application Ser. No. 17/860,895 filed Jul. 8, 2022, entitled ENERGY STORAGE SYSTEM HEATER CONTROL ARCHITECTURE, the entire contents of which are hereby incorporated by reference.

TECHNICAL FIELD

This disclosure relates to electrical energy storage systems and, in particular, to a thermal management system for an electrical energy storage system.

BACKGROUND

Energy storage systems, such as battery management systems, suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a thermal management system is provided for an energy storage system, the energy storage system comprising an energy storage device, an energy storage monitoring system including circuitry dedicated and configured to monitor a temperature of the energy storage device, the energy storage monitoring system including an energy storage controller; wherein the thermal management system comprises a thermal management conditioning loop, a pump configured to circulate a thermal management fluid through the thermal management conditioning loop, a heat source, and a heat transfer hardware in thermal communication with the energy storage device, wherein the heat source, the heat transfer hardware, and the energy storage device are in thermal communication with the thermal management fluid via the thermal management conditioning loop, and wherein the energy storage controller of the energy storage monitoring system is configured to confirm that a temperature of the thermal management fluid and/or a temperature of the energy storage device is below an upper safety limit, between a lower control limit and an upper control limit, or both, and in response, to send an enable heater request indicating the heat source is to turn on.

One interesting feature of the systems and methods described below may be that on a relatively cold day, if a battery is below its allowable or target operating temperature, the battery may be safely heated to raise its temperature into the allowable or target operating range. As a result, the battery may better perform its function of delivering and/or receiving energy without inadvertently harming the battery. Heat may be added to (or extracted from) the battery via the thermal management conditioning fluid that is in a closed loop system in which the battery may be in thermal communication with a waste heat source such as power electronics in a hybrid electric system. An in-line heater may help heat the battery via the thermal management conditioning fluid.

In some examples, an energy storage system may be part of a hybrid electric system that includes a gas turbine engine as a hybrid propulsive system. Alternatively, or in addition, the hybrid electric system may include any other type of internal gas combustion engine. In still other examples, the energy storage system may not be part of hybrid system and instead be part of an all-electric engine system.

Figure 1:
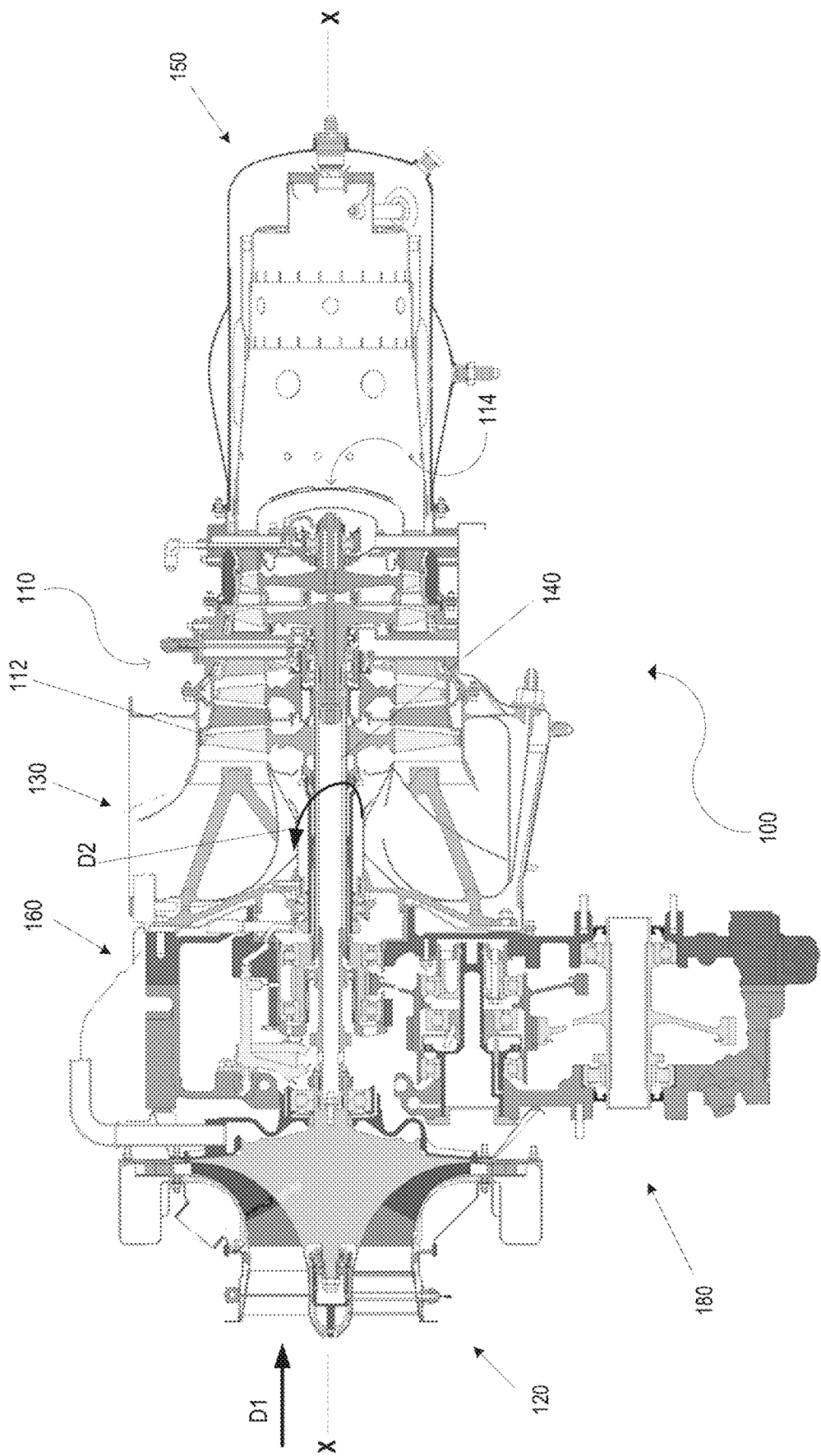
FIG. 1 is a cross-sectional view of a gas turbine engine.

In connection with a hybrid electric system, FIG. 1 is a cross-sectional view of a gas turbine engine 100. In some examples, the gas turbine engine 100 may supply power to and/or provide propulsion for an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, and any other airborne vehicle. Alternatively, or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as a two-spool engine having a centrifugal compressor and axial flow gas generator and power turbine stages, in some forms the gas turbine engine 100 may have one or multiple spools and/or may be any form of axial flow engine or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples. In some examples, the gas turbine engine 100 may include a power transfer 180 in the form of a transmission or gearbox. The power transfer 180 may extract energy from the engine output in the form or torque at an angular velocity, and transfer such energy to other components within an aircraft. In an example of a helicopter or airplane, the power transfer 180 may transfer energy extracted from the engine to one or more propulsors. As used herein, the term "propulsor" or "propulsors" is defined as a helicopter rotor, an airplane propeller, a ducted fan, or other mechanical device that is rotational driven by a motor to provide propulsion.

Figure 2:
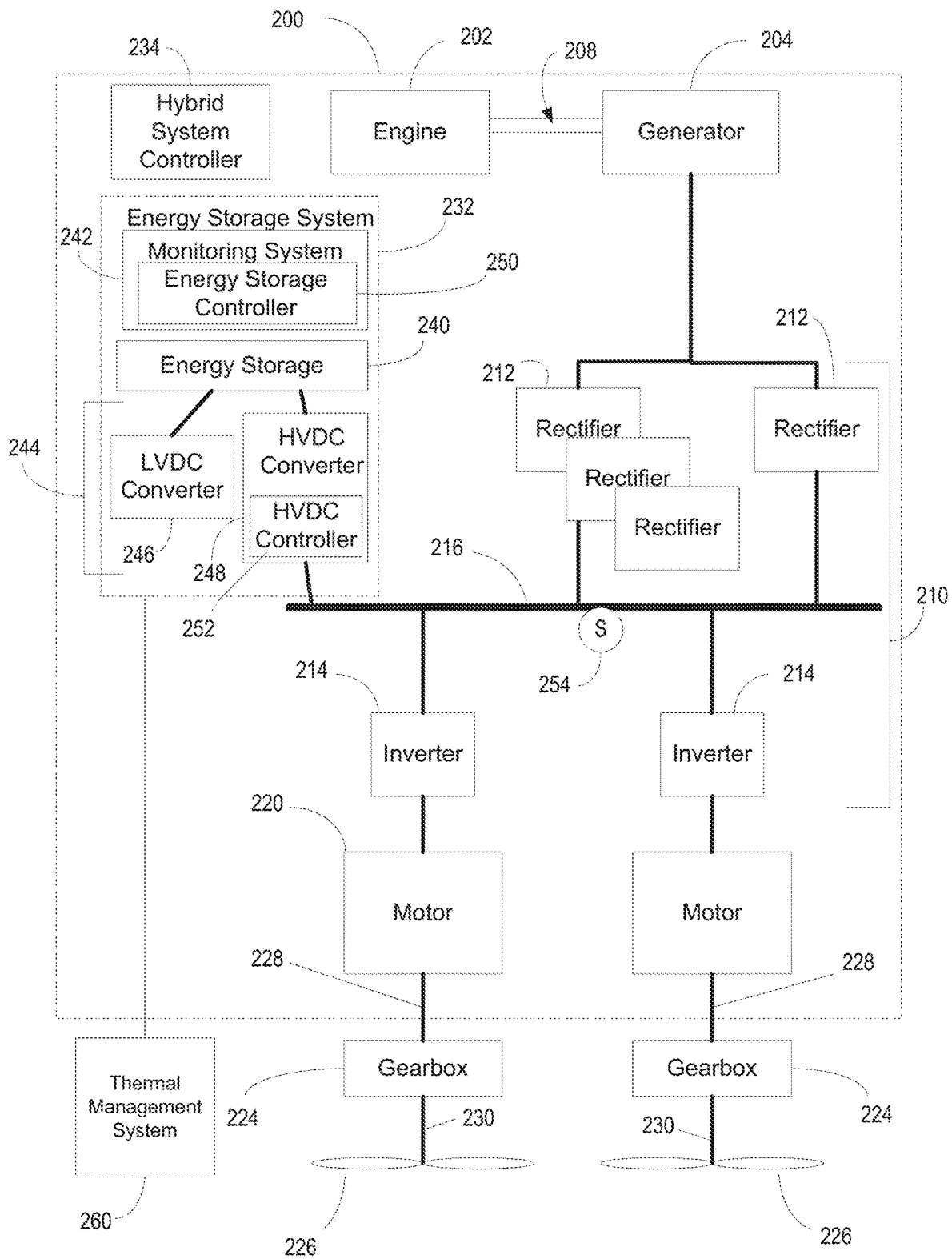
FIG. 2 is a block diagram example of a hybrid electric system operable with a gas turbine engine as a hybrid propulsive system for an aircraft.

FIG. 2 is a block diagram of an example of a thermal management system 260 in the context of a hybrid electric system 200 operable with a gas turbine engine 202 as a hybrid propulsive system. The hybrid electric system 200 includes at least one electric generator 204 rotatably coupled with a corresponding gas turbine engine 202 to form a turbogenerator. The hybrid electric system 200 may be configured as a variable load supplied rotational energy by the gas turbine engine 202. The gas turbine engine 202 may be supplied fuel by a fuel system at a variable flow rate to vary the rotational torque output of the gas turbine engine 202. The gas turbine engine 202 may include a power takeoff that spins a rotational shaft 208 mechanically coupled to the electric generator 204.

The generator 204 may be an asynchronous or synchronous machine capable of outputting electric power when rotated by the shaft 208. The electric power may be output as alternating current (AC) or direct current (DC) power feeding one or more electric energy adapters 210. In the illustrated example, the generator 204 is an AC generator feeding one or more electric energy adapters 210. The electric energy adapter(s) 210 may include one or more rectifiers 212, one or more inverters 214, and/or other energy adapter devices or systems, such as converters, transformers, filters, and the like. The rectifiers 212 may be AC to DC rectifiers supplying rectified electric power output from the generator 204 to one or more high voltage supply busses, which in the illustrated example, are aircraft engine supply busses 216. Loads may be electrically coupled with the aircraft engine supply bus 216 and supplied the electric power output from the generator 204. A voltage of the electric power on the aircraft engine supply bus 216 may be stepped up, stepped down, or converted, such as from DC to AC prior to being supplied to the loads. In the example of FIG. 2, the aircraft engine supply bus supplies inverters 214. The inverters 214 may convert the DC power to AC power and supply the AC power to one or more propulsor motors 220.

The propulsor motors 220 may be energized by the voltage present on the aircraft engine supply bus 216 to rotate gearbox 224, which in turn may rotate a propulsor 226, such as an airplane propeller or a helicopter rotor, which can provide lift and/or thrust to the aircraft. The propulsor motors 220 may include one or more induction or synchronous motors operable to rotate an output shaft 228 when energized with a variable rotational torque. The output shaft 228 may be mechanically coupled with the gearbox 224. The gearbox 224 may operate as a transmission system between the propulsor motors 220 and the propulsor 226 to change the rotational speed of the output shaft 228 of the propulsor motor 220 and supply rotational torque on a propulsor shaft 230 rotating the propulsors 226.

In addition to the rectifiers 212 supplying power to the aircraft engine supply bus 216, an energy storage system (ESS) 232 may also supply either AC or DC power to the aircraft engine supply bus 216. The hybrid electric system 200 for the aircraft or other vehicle may also include a hybrid system controller (HSC) 234. The hybrid system controller 234 may include circuitry configured to perform at least some of the functions described herein. The hybrid system controller 234 may, for example, include a non-transitory memory with instructions stored therein that are executable by the hybrid system controller 234. The hybrid system controller 234 may include one or more processors executing logic based on the stored instructions.

During operation, the hybrid system controller 234 may perform power balancing and manage/govern other controllers within the hybrid electric system and/or perform the functionality, or cause to be performed, the functionality described herein. In addition, the hybrid system controller 234 may manage and control the energy storage system 232. Further, the hybrid system controller 234 may control aspects of operation of the gas turbine engine 202.

The hybrid system controller 234 may manage and control the energy storage system 232 in accordance with control signals received from a full authority digital control system (FADEC) (not shown). In other examples, the functionality of the FADEC and the hybrid system controller may be resident in the same controller or a series of controllers.

The energy storage system (ESS) 232 may include, for example, one or more energy storage devices 240 (such as batteries, fuel cells, capacitors, and supercapacitors) an energy storage monitoring system 242, such as a battery management system (BMS), and power electronic converters 244, such as, a Low Voltage DC:DC Converter 246 (LVDC Converter) and a High Voltage DC:DC Converter 248 ("HVDC Converter", or more generally, "high voltage converter"). The energy storage monitoring system (such as the BMS 242) may include energy storage controller 250, which may include a processor executing instructions stored in memory to provide at least the functionality described herein.

The energy storage monitoring system 242 includes circuitry dedicated to monitoring one or more properties of the energy storage devices 240. Examples of properties monitored by the energy storage monitoring system 242 may include detection of battery type, voltages, temperature, capacity, state of charge, power consumption, remaining operating time, charging cycles, and/or any other properties of the energy storage devices 240. In some examples, the energy storage monitoring system 242 may include circuitry dedicated to regulating the charging and/or the discharge of the energy storage devices 240.

The energy storage system 232 may also include a High Voltage DC controller 252 ("HVDC controller" or more generally, "high voltage controller") configured to control the HVDC converter 248 using, for example, a processor executing instructions stored in memory. The ESS 232 may use a thermal management system 260 for managing the temperature of components such as the energy storage device 240, the LVDC converter 246, and the HVDC converter 248 due to significant variations in ambient temperature, such as from −40° C. to +55° C. In some examples, some components, such as the energy storage devices 240 need cooling, but not heating. The ESS 232 may be part of the hybrid electric system 200 that includes the hybrid system controller (HSC) 234, multiple loads and power sources, where the HSC 234 is responsible for power balancing and governing controllers that may be distributed within the hybrid electric system 200.

The Energy Storage System (ESS) 232 may be either a load or a source on the aircraft engine supply bus 216 according to operating conditions. The electric generator 204 may be rotational driven with the gas turbine engine 202 as a turbogenerator to output electric power, which may be supplied to the one or more propulsor motors 220 via the aircraft engine supply bus 216. The energy storage device 240 may also supply electric power to the aircraft engine supply bus 216. The energy storage device 240 may be a battery, a capacitor, or any other device or system capable of storing and discharging electrical energy. The electric energy adapters 210 may adjust a voltage level and/or provide conversion of electric power between alternating current (AC) and direct current (DC). In the example of FIG. 2, the electric energy adapters 210 include rectifiers 212 and inverters 214. The rectifiers 212 may rectify AC power received from the electric generator 204 to provide DC power to the aircraft engine supply bus 216. The inverter 214 may invert DC power received from the aircraft engine supply bus 216 to provide AC power to the propulsor motors 220. In other examples, other configurations of AC and DC power may be used, or only AC, or only DC power may be used. In the illustrated example, when the ESS 232 is supplying power, the HVDC converter 248 may convert a voltage level of DC power received from the energy storage device 240 to a different voltage level of DC power present on the aircraft engine supply bus 216. The generator 204, the ESS 232 and/or the electric energy adapters 210 may receive control communications directly or indirectly from the hybrid system controller 234.

The hybrid system controller 234 may indirectly control the generator 204, the ESS 232 and the electric energy adapters 210 via local controllers in communication with the hybrid system controller 234. The generator 204, the ESS 232 and electric energy adapters 210 may include, or be in communication with, a respective local control that provides the operational functionality of the respective system or device. For example, the generator 204 may include a local generator control configured to control the electrical characteristics and operation of the generator 204, such as the power factor angle, excitation voltage, and/or watts produced. In examples where the energy storage device 240 is a battery, the energy storage controller 250 included in the BMS 242 associated with the energy storage device 240 may include the functionality to enable selective charge and discharge of the battery in accordance with predetermined operational parameters, such as charge and discharge limits. In some examples, the rectifiers 212 may include a local rectifier controller circuitry configured to control active rectification switching of the rectifier 212 from AC to DC power. In some examples, the inverters 214 may include a local inverter controller circuitry configured to control active conversion switching of DC power from the aircraft engine supply bus 216 to AC power to drive the propulsor motors 220.

In addition, the DC voltage and current output to the aircraft engine supply bus 216 via the HVDC converter 248 may be controlled and regulated by the HVDC controller 252. In that regard, power sensors 254, such as voltage and current sensors may monitor the aircraft engine supply bus 216 and provide dynamic sensor signals to the HVDC controller 252 to enable this control. Although illustrated in FIG. 2 as separate devices, the LVDC converter 246 and the HVDC converter 248 may be included in a common converter providing low voltage and high voltage conversion. In an example, the LVDC converter 246 may convert the energy storage device 240 output voltage to a relatively low voltage such as below 30 Volts DC, whereas the HVDC converter 248 may output a relatively high voltage such above 1000 Volts DC.

During operation, the ESS 232 may dynamically supply or receive power from the aircraft engine supply bus 216 according to the bus voltage of the aircraft engine supply bus 216. As an example, as load on the aircraft engine supply bus 216 increases faster than or beyond what the generator 204 can supply, the energy storage devices 240 may supply current to the aircraft engine supply bus 216 to avoid the bus voltage dropping. If, on the other hand, load on the aircraft engine supply bus 216 decreases faster than the generator 204 can respond, the energy storage devices 240 may be supplied current from the aircraft engine supply bus 216 to avoid the bus voltage increasing. Most importantly here, as the ESS 232 is supplying power and receiving power from the aircraft engine supply bus 216, the temperature of the components of ESS 232 may increase or decrease beyond desired temperature ranges. The ESS 232 may include multiple operating modes within the hybrid electric system 200 that influence the amount of cooling or heating the ESS 232 needs at certain stages of operation. For example, the ESS 232 may include the operating modes of:

1. High Aircraft Power Losses—Energy storage device 240 delivering maximum emergency power to the aircraft engine supply bus 216 due to high power demand.
2. Medium Aircraft Power Losses—Energy storage device 240 delivering power to the aircraft engine supply bus 216 in response to power demand being within pre-determined projected range of power output, such as providing hybrid aircraft take-off assist power.
3. Low Aircraft Power Losses—Energy storage device 240 not delivering or receiving power from aircraft engine supply bus 216—no or negligible power demand. Under this operating mode, LVDC converter 246 may still be delivering power supplied via the HVDC Converter 248 from the aircraft engine supply bus 216, albeit at low power losses. During these operating modes, components of the ESS 232, such as the energy storage device 240, may be operated within their allowable or desirable temperature limits. This may be achieved using the thermal management system 260.

Figure 3:
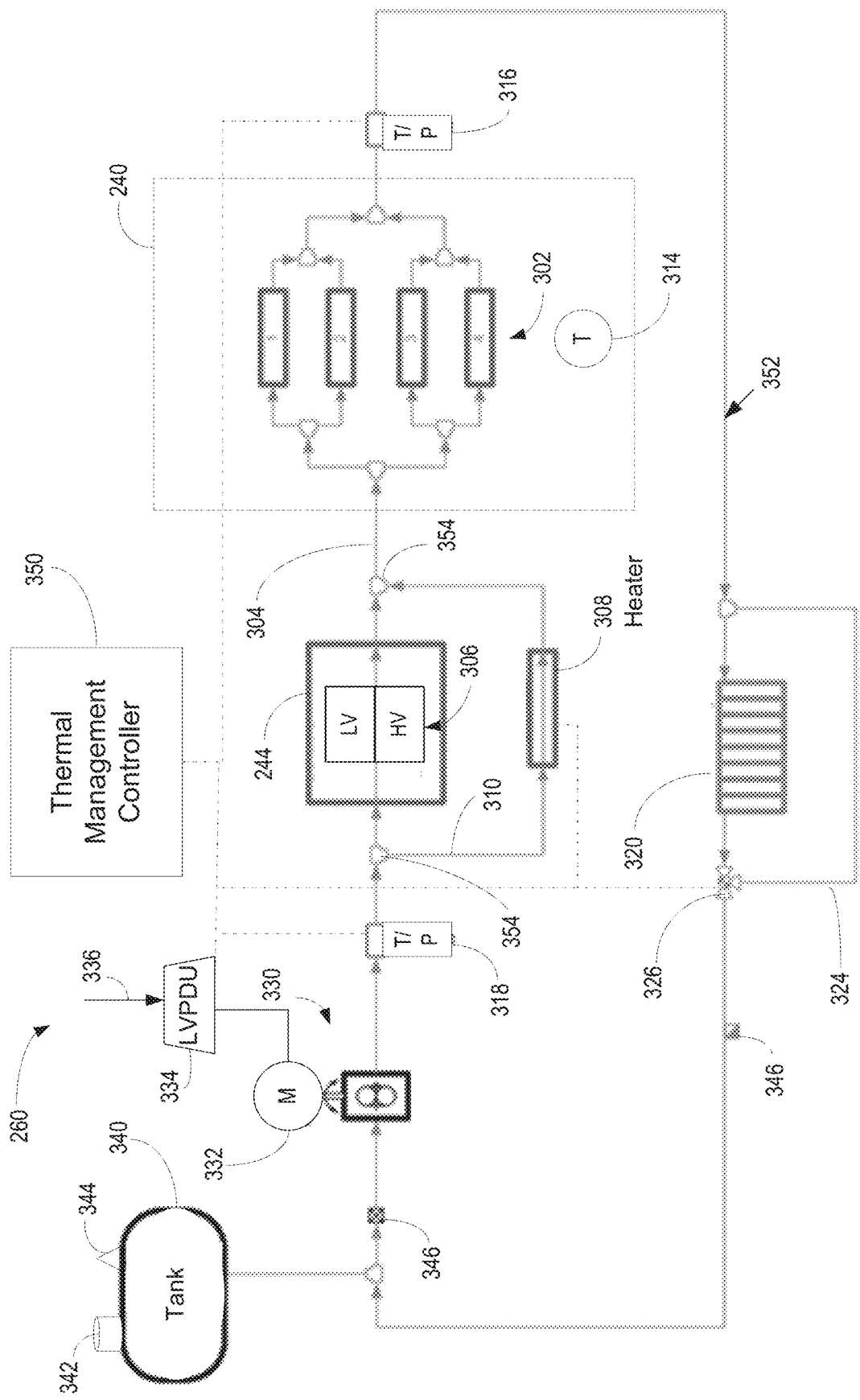
FIG. 3 is an example thermal management system for a hybrid electric system.

FIG. 3 is an example of the thermal management system 260 used in the hybrid electric system 200. The thermal management system 260 may be used to regulate, for example, the temperature of the energy storage device 240. In the illustrated example, temperature conditioning of the energy storage device 240 may be performed with heat transfer hardware 302, such as flow plates, which may be contiguously positioned on the energy storage device 240 to absorb heat generated by the energy storage device 240 or transfer heat to the energy storage device 240. In the illustrated example, the heat transfer hardware 302 may be coupled in parallel by fluid lines 304 in which a thermal management fluid, such as a liquid or a gas may be circulated. In FIG. 3, four flow plates are shown as the heat transfer hardware 302, however, in other examples, fewer or greater numbers of flow plates or other types of heat transfer hardware may be present. In addition, in other examples, other forms of fluid-based heat absorption and conduction hardware may be used, such as conductive or immersive liquid cooling/heating hardware in the form of, for example, heat sinks, cooling matrices, cooling fins, and the like. The heat transfer hardware 302 is configured to be in thermal communication with the energy storage device 240 and the thermal management fluid.

Control of the temperature of the energy storage device 240 by the BMS 242 may be based on one or multiple temperature sensors 314 mounted on or in the energy storage device 240. For example, in the case of batteries, one or more of the temperature sensors 314 may be mounted directly on the batteries to monitor battery cell surface temperature and/or the temperature sensors 314 may be embedded in the battery cell to monitor the temperature inside of the battery cell. In addition, one or more sensors 316, such as a pressure or a temperature sensor in the fluid line 304 downstream of the energy storage device 240 and sensing at least one of pressure or temperature of the thermal management fluid in the energy storage device 240 may be implemented.

The power electronic converter 244, such as the LVDC and HVDC converters 246 and 248, may also include heat transfer hardware 306 capable of transferring heat between the thermal management fluid and the power electronic converter 244. In FIG. 3, the power electronic converter 244 may include functionality of both LVDC and HVDC converters 246 and 248, which are subject to a common stream of the thermal management fluid supplied to the heat transfer hardware 306, such as respective HV and LV flow plates, via the fluid line 304. An in-line heater 308 may provide additional heating of thermal management fluid present in the bypass line 310 when the amount of heat energy transferred to the thermal management fluid from the power electronic converter 244 is insufficient to meet the heating needs of the energy storage device 240. The in-line heater 308 may be, for example, an electric powered resistive heating element. In other examples, the bypass in-line heater 308 may provide heating based on any other heat source, such as waste heat from the gas turbine engine 202 or any other type of engine included in the hybrid electric system 200. The bypass in-line heater 308 may heat the thermal management fluid in the bypass line 310 based on one or more sensors 318, such as a pressure and/or temperature sensor, upstream of the power electronic converter 244 and the bypass in-line heater 308.

The discussion herein of the thermal management system 260 and other systems may refer to a "battery" as the energy storage device 240 for illustrative purposes; however, the energy storage device 240 is not limited to batteries. Moreover, other components in the ESS 232 may be heated and/or cooled by the thermal management system 260 in addition to or instead of the energy storage device 240. In the event the battery 240 needs to be cooled to keep it within its allowable operating temperature range, the thermal management fluid extracts heat from the battery 240 and then the heat is removed from the fluid using a heat exchanger 320. In the example shown, this is achieved with an airframe mounted air-cooled heat exchanger 320. In other examples, other forms of heat exchanger may be used, such as a shell and tube heat exchanger, plate heat exchanger, plate and shell heat exchanger, adiabatic wheel heat exchanger, plate fin heat exchanger, finned tube heat exchanger, pillow plate heat exchanger, and the like. The heat exchanger 320 may include a bypass line 324 controlled by a thermal bypass valve 326 to divert the thermal management fluid around the heat exchanger 320 if temperature regulation of cooling or heating of the thermal management fluid with the heat exchanger 320 is not needed.

A pump 330 is included to circulate the thermal management fluid around a thermal management conditioning loop 352 formed with the fluid lines 304 to transfer fluid between a tank 340, the in-line heater 308/power electronic converter 244, the heat exchanger 320 and the components to be temperature conditioned, such as the battery 240. The tank 340 may be, for example, an expansion tank that includes a fill port 342 to receive the thermal management fluid, and a pressure relief valve 344 to automatically relieve pressure within the tank 340 when the tank internal pressure goes above a predetermined pressure threshold. Screens 346 may be included in the fluid lines 304 upstream and downstream of the tank 340 to call small particle debris in the thermal management fluid.

The pump 330 may be any electric pump having an electric motor 332 that is selectively energized by a low voltage power distribution unit (LVPDU) 334. The pump 330 may be any form of pump capable of pumping the thermal management fluid through the fluid lines 304. The LVPDU 334 may operate as a switch, such as an electric contactor, a circuit breaker, or some other switching device capable of being selectively electrically actuated to supply low voltage DC power to the pump motor 332. The low voltage DC power may be supplied to the LVPDU 334 from the LVDC converter 246 (FIG. 2) on a pump power line 336. The pump motor 332 may be a variable speed motor responsive to changes in voltage to adjust the pumped volume or throughput or capacity of the thermal management fluid through the pump 330.

Thermal management controller 350 may control activation and deactivation of the pump 330 via the LVPDU 334. In addition, the thermal management controller 350 may perform other operations and functionality of the thermal management system 260 as described herein. In an example implementation, the thermal management controller 350 may include a processor and memory executing instructions to perform the functionality described herein via an input/output interface. Alternatively, or in addition, at least a portion of the functionality of the thermal management controller 350 may be included in the energy storage controller 250 of the ESS 232. Alternatively, or in addition, at least a portion of the functionality of the thermal management controller 350 may be included in the HVDC controller 252. Alternatively, or in addition, at least a portion of the functionality of the thermal management controller 350 may be included in the hybrid system controller 234.

The bypass line 310, which includes a heat source such as the in-line heater 308, is fluidly coupled to the rest of the thermal management conditioning loop 352 by two junctions 354 that are in turn also fluidly coupled to the inlet and outlet respectively of the heat transfer hardware 306 that is in thermal communication with the power electronic converter 244. In some examples, any of the two junctions 354 may be a thermal bypass valve or a value switchable by a controller such as the HVDC controller 252 so that the thermal management fluid may be permitted to or prevented from flowing through the bypass line 310 and the heat source 308.

During example operation, the thermal management controller 350 may control sequencing of the pump 330, used to circulate the thermal management fluid, to cooperatively operate with the in-line heater 308. Cooperative operation of the pump 330 in connection with in-line heater 308 may include the following functionality implemented with the thermal management controller 350. Features related to cooperatively operating the pump 330 and the in-line heater 308 and/or to improving operation or safety of the battery may include one or more of the following:

- The in-line heater 308 may be allowed to operate only if there is sufficient power for the in-line heater 308, otherwise the heating may not be sufficient to reach the required temperature. The in-line heater 308 may receive its power from, for example, a main high voltage bus of the hybrid electric system 200 such as the high voltage aircraft engine supply bus 216.
- The in-line heater 308 may be allowed to operate only if all associated controllers have operable communication ability. The controllers being able to communicate enables "handshakes" between the relevant controllers to occur for appropriate sequencing.
- The in-line heater 308 may be allowed to turn on only if the temperature of the batteries is below the allowable operating range. Otherwise, there may be a risk of overheating the batteries. If the temperature of the battery exceeds a failure temperature, then the batteries may be considered overheated. An example of the failure temperature may be 90° C. To that end, further protection may be obtained by, for example ensuring the BMS 242 is monitoring the surface temperature of the cells using the temperature sensors 314 and/or the monitoring the pressure and temperature of the thermal management coolant at the inlet to the ESS 232 and at the outlet of the ESS 232 using the sensors 316 and 318.
- The in-line heater 308 may be allowed to operate only if the pump 330 is operational (for example, pumping) in order to avoid the risk of localized excessive heating. This may provide heater over temperature protection which can avoid a delay in heating the batteries and/or prevent localized overheating due to lack of flow or leaks.
- The hybrid system controller 234 may be responsible for applying and/or removing the power supply to the pump 330. The power to the pump 330 may come from, for example, an auxiliary low voltage bus (not shown) in the hybrid electric system 200 or some other power source.
- The HVDC controller 252 may be responsible for turning the in-line heater 308 on and off.
- The HVDC controller 252 may be responsible for sending a speed command to the pump 330. The speed command may indicate the speed at which the pump 330 is to pump.
- The thermal management conditioning loop 352 may include a thermal bypass valve 326 for the heat exchanger 320. The heat exchanger 320 may be selectively bypassed depending on an open/closed status of the thermal bypass valve 326. The thermal bypass valve 326 may change the open/closed status if the thermal management fluid is at or below a predetermined temperature at which cooling by the heat exchanger 320 is unnecessary. Thus, if the battery 240 needs heating to keep the battery 240 within an allowable or target operating temperature range, the heat exchanger 320 may be bypassed and the thermal management fluid flowing via the fluid lines 304 to the battery 240 may be heated with the power electronic converter 244 and/or the in-line heater 308.

Figure 4:
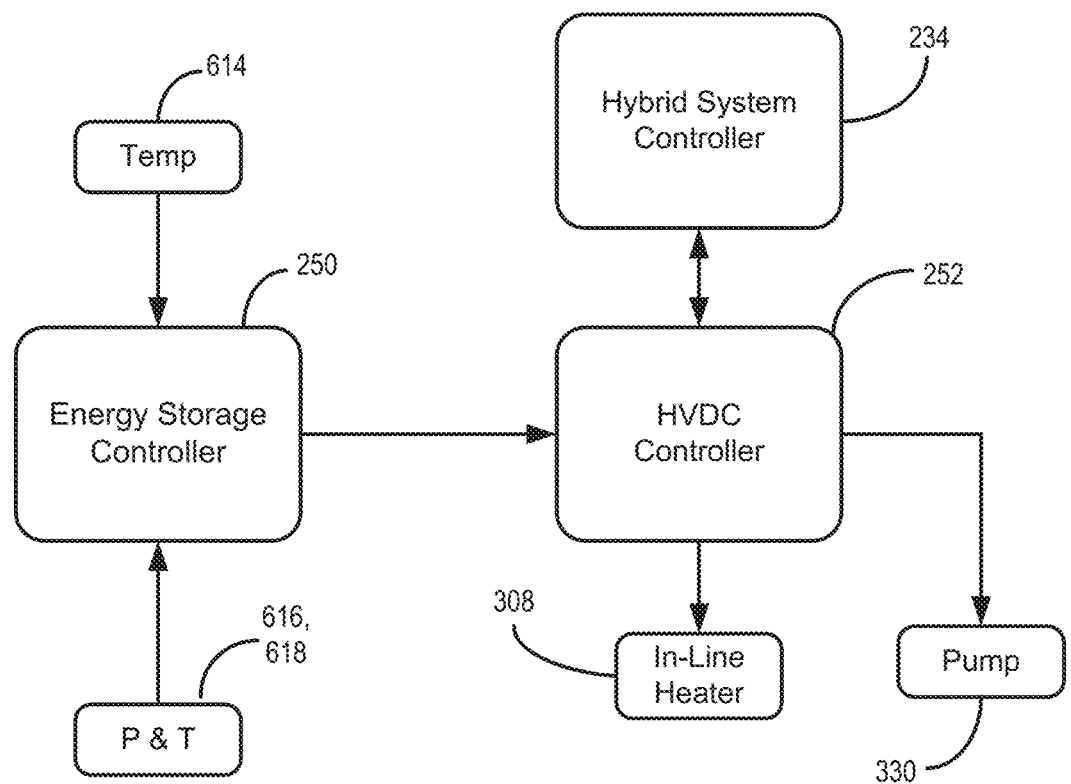
FIG. 4 illustrates an example operational configuration of controller circuitry in the hybrid electric system.

FIG. 4 is a schematic diagram of an example of the relevant controllers 250, 234, and 252 and the communication interfaces between the controllers. In this example, the communication interfaces between the controllers and select other components of the hybrid electric system 200 are also shown. In the illustrated example, the thermal management controller 350 is omitted. In other example configurations, the functionality of the controllers may be distributed differently than illustrated. In addition, in other examples, different, additional, or fewer communication interfaces may be implemented to accomplish the functionality described herein.

In the example illustrated in FIG. 4, the energy storage controller 250 of the BMS 242 receives sensor signals representing temperature 614 from the sensors 314 monitoring battery cell temperatures. In addition, the energy storage controller 250 receives information directly from sensors 316 and 318, which measure pressures 616 and temperatures 618 of the thermal management fluid in the fluid lines 304 at the inlet and outlet of the energy storage system 232. Further, the energy storage controller 250 of the BMS 242 may receive other temperatures (not shown), such as the temperature of the in-line heater 308, the HVDC converter 248, and the LVDC converter 246.

In the example of FIG. 4, the control circuitry of the pump 330 and the in-line heater 308 are implemented within the HVDC converter 248, namely, in the HVDC controller 252 included in the HVDC converter 248 (referring also to FIGS. 2-3). The HVDC controller 252, among other things, may be responsible turning the in-line heater 308 on and/or off. In addition, HVDC controller 252 may be responsible for sending power commands to control the pump 330. For example, the HVDC controller 252 may provide a pulse-width-modulated (PWM) signal to the pump 330 for dynamic speed (and hence power) control.

In the illustrated example, the hybrid system controller 234 may direct the HVDC controller 252. Accordingly, in this example, hybrid system controller 234 may control coordinated operation of the pump 330 with the in-line heater 308 to bring the batteries 240 within a desired predetermined temperature range in accordance with bits/commands provided by the energy storage controller 250 and by the HVDC controller 252. For example, the energization of the in-line heater 308 may be enabled only by a request from the energy storage controller 250 (in other words, a BMS heater request or enable heater request) and confirmation of a safe operation indication of the hybrid electric system 200 via the hybrid system controller 234, and confirmation of safe operation of the HVDC converter 248 via the HVDC controller 252. The in-line heater 308 may be deenergized by a request from the energy storage controller 250, the hybrid system controller 234, or the HVDC controller 252. In some examples, the in-line heater 308 may deenergize itself in response to the in-line heater 308 detecting overheating. For example, the in-line heater 308 may include a temperature sensor coupled to a controller included in the in-line heater 308 and the controller is configured to deenergize the in-line heater 308 if the temperature of the thermal management fluid in the in-line heater 308 detected by the temperature sensor exceeds a temperature threshold. Alternatively or in addition, the in-line heater may include a passive device, such as a thermostatic temperature control valve, which deenergizes the in-line heater 308 and/or halts or limits the flow of the thermal management fluid through the in-line heater 308 if the temperature of the thermal management fluid in the in-line heater 308 exceeds a temperature threshold.

Operation of the in-line heater 308 and the pump 330 may be implemented with a combination of computer logic and hardware logic to ensure safe and reliable operation under various operating conditions and failure modes. Additional levels of safety within the energy storage system 232 may be provided by one or more of the following features:

1. Coolant Temperature Monitoring—Concurrent inlet and outlet temperature measurement of the thermal management fluid in the fluid lines 304 at the inlet and outlet of the energy storage system 232 and checking against predefined temperature limits.
2. Pump Operational—Enabling the in-line heater 308 only if the pump 330 is enabled, in other words, only if the pump 330 is pumping.
3. Power Available—Enabling the in-line heater 308 only if sufficient power is available for the in-line heater 308 and/or for the pump 330.
4. Communication Integrity—Enabling the in-line heater 308 only if the relevant controllers, such as the hybrid system controller 234, the energy storage controller 250, and the HVDC controller 252, are able to communicate.

Figure 5:
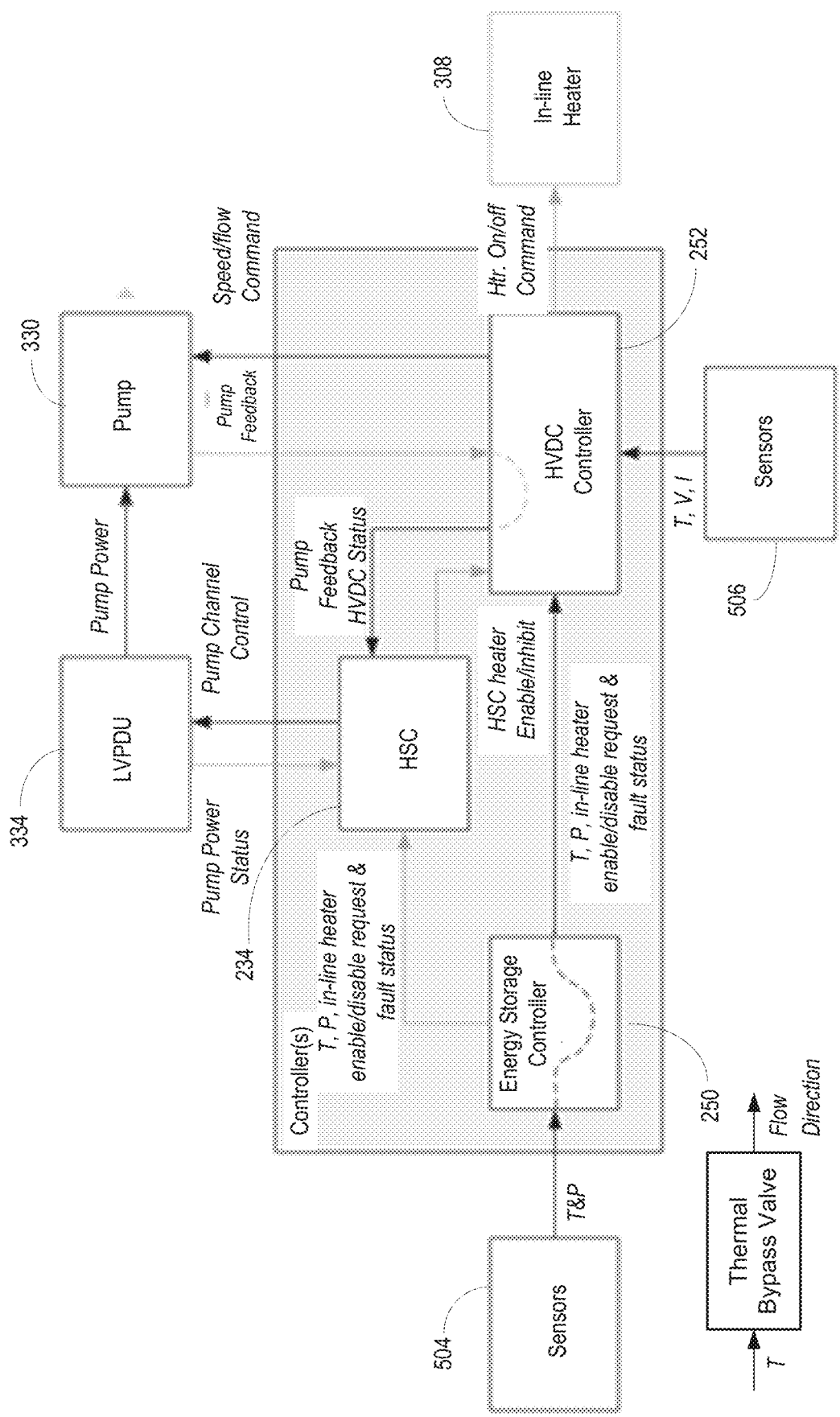
FIG. 5 is a block diagram illustrating example data flows/signals between the controllers and sensors/devices in an example hybrid electric system.

FIG. 5 is a block diagram illustrating example data flows and/or signals related to heater control between the controllers and sensors/devices in an example hybrid system controller 234. Referring to FIGS. 2-5, in the example illustrated in FIG. 5, the low voltage power distribution unit (LVPDU) 334 includes a switch controlled by the hybrid system controller 234 to apply and/or remove low voltage power for the pump 330. The hybrid system controller 234 may receive a pump power status from the LVPDU 334 indicating whether the pump 330 is enabled.

Sensors 504 may supply sensor signals to the energy storage controller 250. The sensor signals may represent the pressure and the temperature of the thermal management coolant, received from, for example, the sensors 316 and 318 at the inlet and outlet of the ESS 232.

Sensors 506 may supply sensor signals to the HVDC controller 252. The sensor signals supplied to the HVDC controller 252 may include, for example, sensor signals representing current and voltage measured on the high voltage supply bus 216 of the hybrid electric system 200 by the power sensors 254. Alternatively, or in addition, one or more of the sensor signals supplied to the HVDC controller 252 may represent the temperature of the heat transfer hardware 306 of the LVDC converter 246 and/or the temperature of the heat transfer hardware 306 of the HVDC converters 248.

In an example signal flow operation, the energy storage controller 250 of the BMS 242 may send a "heater enable" bit to the HVDC controller 252 when the BMS 242 is ready for the energy storage device 240, such as a battery, to be heated. The hybrid system controller 234 may monitor this communication from the energy storage controller 250 to the HVDC controller 252 and acquiesce by taking no contrary action. The hybrid system controller 234 may enable or inhibit heating by communication of a "HSC heater allow/inhibit" signal. The signal may be, for example, a bit that is set to allow/enable the HVDC controller 252 to proceed with heating when the hybrid system controller 234 is satisfied that the hybrid electric system 200 is configured appropriately to allow heating to commence. An example logic the hybrid system controller 234 may perform to be satisfied may be to check a fault status signal from the energy storage controller 250 to confirm that the pump 330 is operational and there are no other faults in the ESS 232.

In some cases, the signal communications of the controllers are optional pass through communications that may be performed when the functionality described herein is distributed differently among the illustrated controllers. The dashed lines shown in FIG. 5 are examples of optional pass through communications. In an example of distributing the functionality differently among the controllers, control of certain functionality may be split among multiple controllers, and/or any controller may receive or read raw data and pass the raw data, or resulting data or commands, on to another controller. In some examples, the controllers may communicate on a common communication bus, such as ARINC-429, MIL-STD-1553, Ethernet, CAN, a universal serial bus (USB), PCI, SCSI, or any other communication protocol by with the controllers may communicate.

Figure 6:
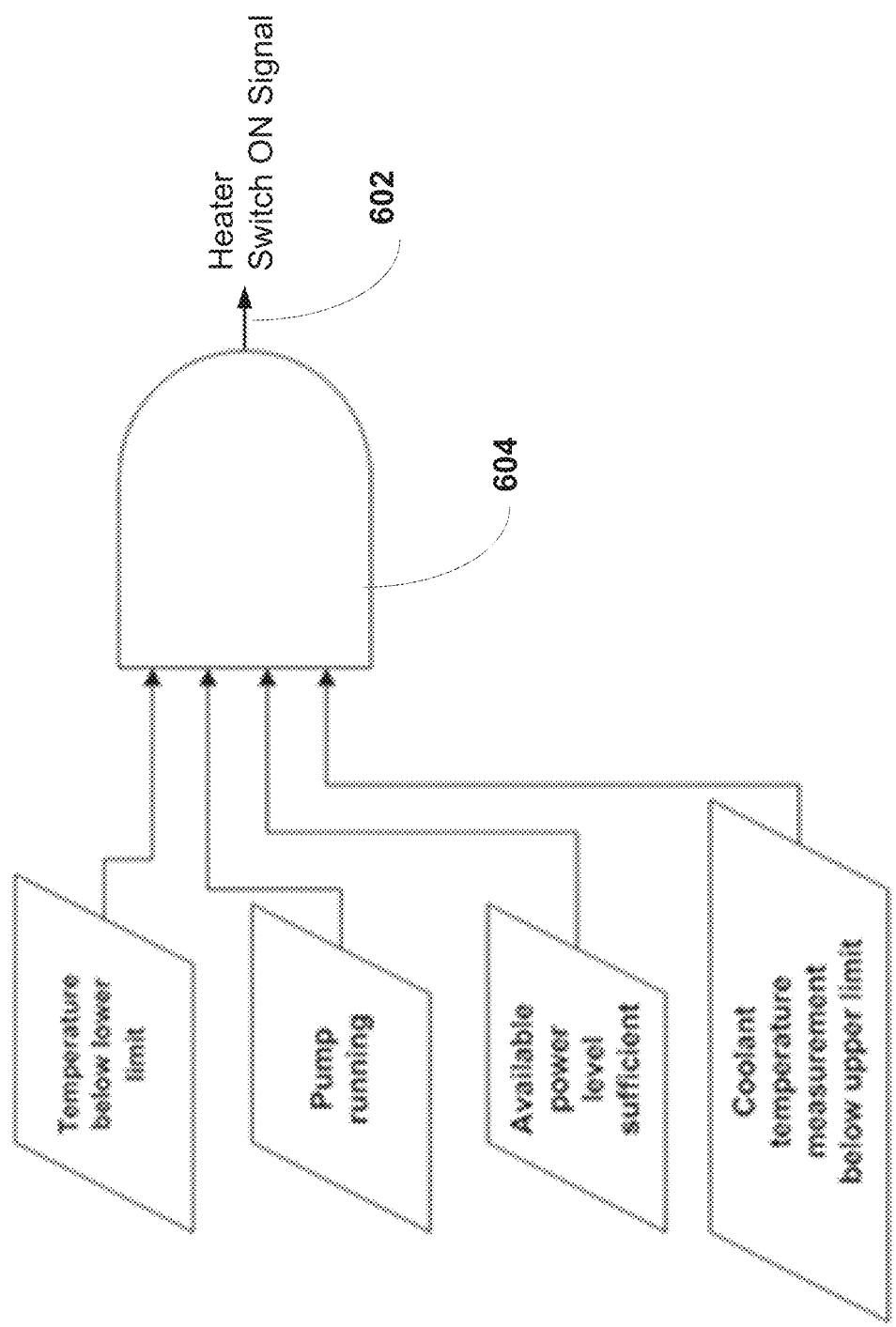
FIG. 6. Illustrates an example of the logic for turning an in-line heater on or off.

FIG. 6. Illustrates an example of the logic for turning the in-line heater 308 on or off. The bits described above in connection with FIG. 5 may form inputs to a heater logic 604 for generating a heater switch on signal 602 as shown in FIG. 6. The heater logic 604 in the illustrated example is a logical "and" of the inputs. The hybrid system controller 234 may be responsible for confirming that the pump is running (using, for example, downstream pressure or power draw measurements) and that the power is sufficient for the in-line heater 308, whereas the BMS 242 is responsible for determining that the temperature detected by the sensor 314 in and/or on the energy storage device 240 is below a lower limit and that the temperature of the heat transfer hardware 306 of the LVDC converter 246 and/or the temperature of the heat transfer hardware 306 of the HVDC converters 248 are within operating limits. All four inputs to the heater logic 604 have to be true for the heater switch on signal 602 to be on. The HVDC controller 252 may provide the heater switch on signal 602 to the in-line heater 308 causing the in-line heater 308 to turn on when the heater switch on signal 602 represents an "on" state, and to turn off when the heater switch on signal 602 represents an "off" state.

The in-line heater 308 may be turned off if any one of the four previously mentioned inputs does not satisfy the turn on criteria. The BMS 242 may have limits preset based on battery operation. The HVDC converter 248 may operate across a wider range of temperatures than the battery, and has to check temperature not only against that provided from the BMS 242 but also based on internal temperature sensors mounted on the LVDC converter 246 and/or the heat transfer hardware 306 of the HVDC converter 248. The current supplied to the in-line heater 308 may be measured or determined by the HVDC controller 252, which may be used to detect whether the in-line heater 308 is in its ON state and/or whether there is a fault in the in-line heater 308. The given example also includes two contactors, one each at the positive and negative rails, with independent control that help to disconnect the in-line heater 308 even when one of them is welded. In addition, current measurement may be used for weld detection as these contactors are light-weight with no feedback. It should also be noted that the heater overtemperature protection may be powered from a 28V supply (or other voltage supply) that is independent from the LVPDU 334 shown in FIG. 3. In case of a fault, a power channel to the LVPDU 334 may be used to force disconnection of the in-line heater 308 from its power source.

FIGS. 7-13 and their descriptions below provide more detail on the logic behind each of the controllers. In addition, some caveats regarding the mode in which the hybrid electric system 200 is operating are provided.

Figure 7:
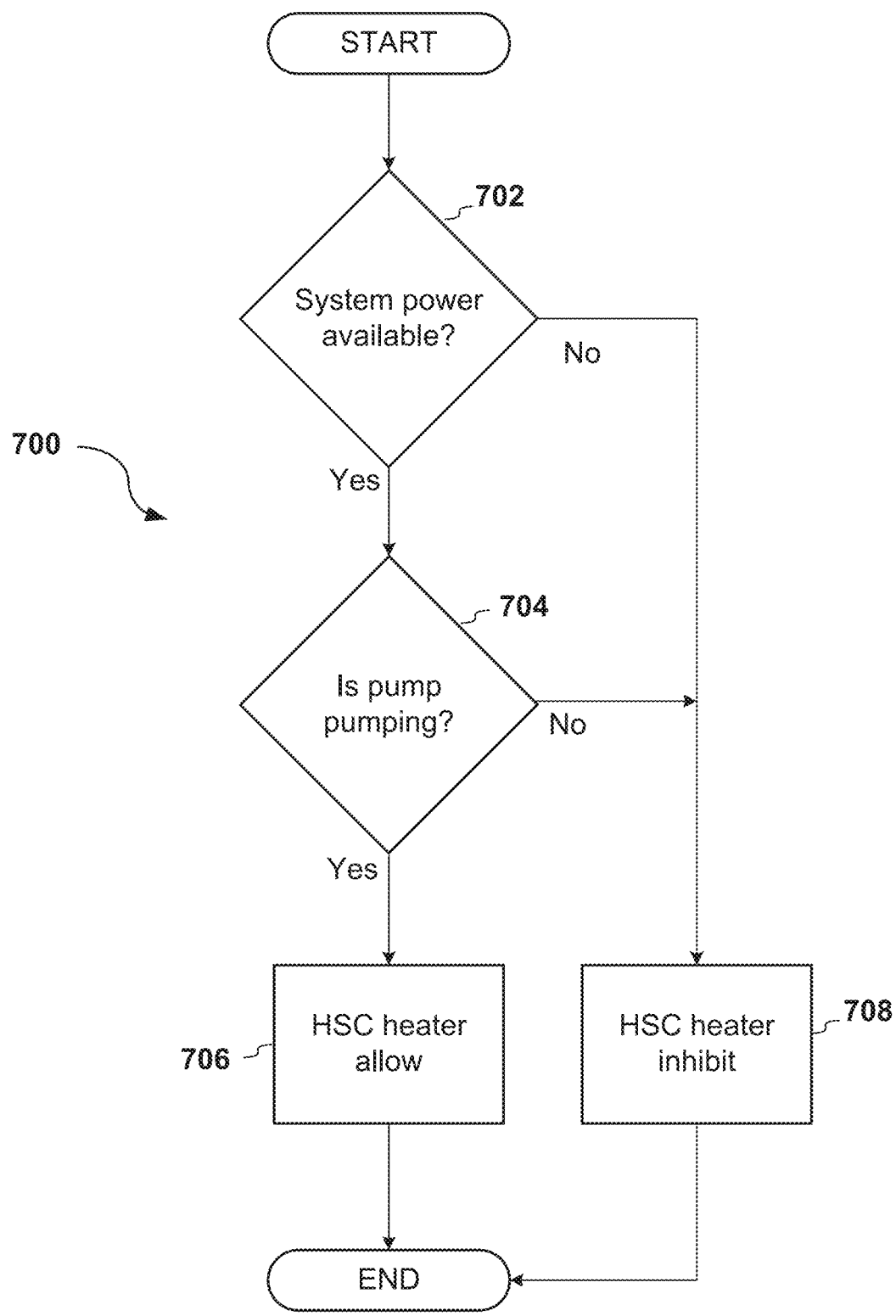
FIG. 7 illustrates example control logic of a hybrid system controller.

FIG. 7 illustrates an example of control logic 700 of the hybrid system controller (HSC) 234. The control logic 700 may include additional, fewer, and/or different operations than in the illustrated example. In addition, the operations may be performed in a different order than illustrated.

Operations may begin by the HSC 234 checking (702) for available power. For example, the HSC 234 may confirm that sufficient power is available for the in-line heater 308 and/or for the pump 330. The phrase "sufficient power" in the context of the in-line heater 308 means enough power is available to the in-line heater 308 that the in-line heater 308 is able to generate heat. The phrase "sufficient power" in the context of the pump 330 means enough power is available to the pump 330 that the pump 330 is able to circulate the thermal management fluid. Next, the HSC 234 may check (704) if the pump 330 is pumping.

If the power is available and the pump 330 is pumping, the HSC 234 sends (706) a hybrid system controller heater allow command ("HSC heater allow command") to the HVDC controller 252 thereby allowing the in-line heater 308 to turn on—in other words, thereby not inhibiting the in-line heater 308 from turning on. Alternatively, if either or both are false, the HSC 234 may send (708) a hybrid system controller heater inhibit command ("HSC heater inhibit command") to the HVDC controller 252, thereby not allowing the in-line heater 308 to turn on. The hybrid system controller heater allow command may be any message indicating that the in-line heater 308 may be turned on. The hybrid system controller heater inhibit command may be any message indicating that the in-line heater 308 is to be turned off. An example of the HSC heater allow command and the HSC heater inhibit command include the "HSC heater allow/inhibit" signal mentioned further above.

In some examples, checking (702) for available power may be based on verifying that sufficient power is available on the HVDC bus 216 of the hybrid electric system 200. However, in other examples where the heating is based on a heat source other an electric heater powered by the HVDC bus 216, the availability of the heat source may be checked. For example, if the heating is based on engine bleed air or a waste heat source in the engine instead of an electric heater, then the engine power of the gas turbine engine and/or valve control for the bleed air may be checked to see if sufficient heating power is available from the engine bleed air or the waste heat source. As another example, if the LVDC converter 246 is bi-directional such that the LVDC converter 246 powers the in-line heater 308, then a low voltage bus of the hybrid electric system 200 may be checked for sufficient available power. In the case of the latter example, sufficient power may be available while a Turbo generation system (TGS) of the hybrid electric system 200 is in passive rectification mode. This may optionally be with a series/parallel heater coil control (voltage is lower when passively rectifying). Alternatively, sufficient power might not be deemed available until after the TGS has entered active rectification mode.

To check (704) if the pump 330 is pumping, The HSC 234 may make the determination from a current measurement (and hence power draw) from the LVPDU 334, or a measurement of downstream pressure in the thermal management conditioning loop 352, or direct feedback from a pump controller.

The operations may end, at which point the control logic 700 may be repeated.

Figure 8:
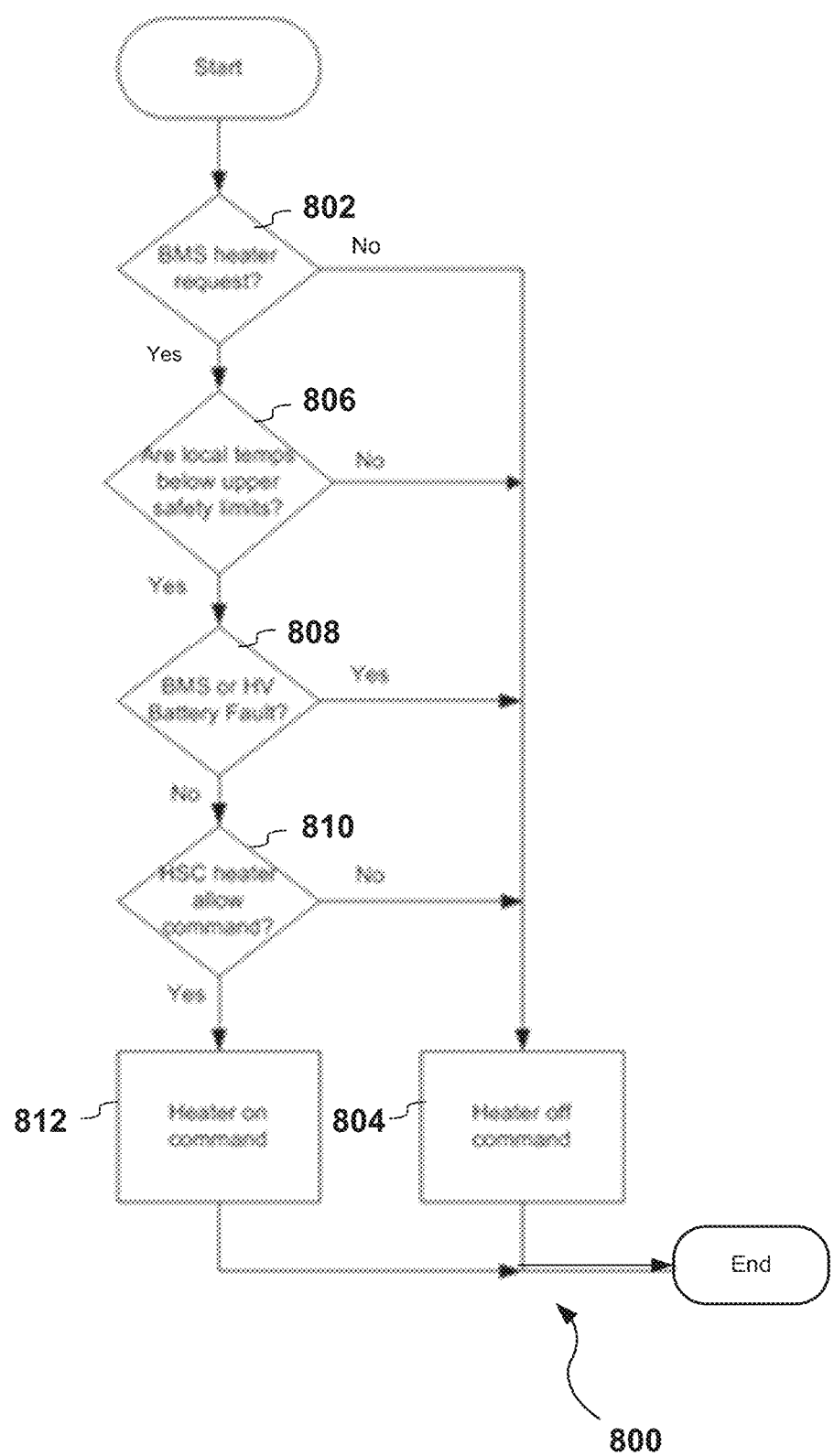
FIG. 8 illustrates example control logic of a controller of a high voltage DC:DC converter.

FIG. 8 illustrates an example of control logic 800 of the HVDC controller 252. The control logic 800 may include additional, fewer, and/or different operations than in the illustrated example. In addition, the operations may be performed in a different order than illustrated.

Operations may begin by checking (802) if a BMS heater request is received from the energy storage controller 250. If not and/or a BMS disable heater request is received, then the HVDC controller 252 may send (804) a heater off command to, for example, the in-line heater 308.

Alternatively, if the BMS heater request is received, then operations may proceed to confirmation (806) that local temperatures are below upper safety limits. The local temperatures may include, for example, the temperature of the heat transfer hardware 306 of the LVDC converter 246 and/or the temperature of the heat transfer hardware 306 of the HVDC converters 248. If not, then the HVDC controller 252 may send (804) the heater off command to, for example, the in-line heater 308.

Alternatively, if the local temperatures are below upper safety limits, operations may proceed to determining (808) if there has been a fault, such as a BMS battery fault or a high voltage fault. If the local temperatures are not below the upper safety limits, then there has been a fault and the HVDC controller 252 may send (804) the heater off command to, for example, the in-line heater 308. In some examples, a communication timeout with the BMS 242 may be treated as a fault.

Alternatively, if the there has not been a fault, then operations may continue to determining (810) if the HSC heater allow command is received from the HSC 234. If not, then the HVDC controller 252 may send (804) the heater off command to, for example, the in-line heater 308. In some examples, a communication timeout with the HSC 234 may be treated as a failure to receive the HSC heater allow command.

Alternatively, if the HSC heater allow command is received, then the HVDC controller 252 may send (812) the heater on command to, for example, the in-line heater 308. An example of the heater on command includes the heater switch ON signal 602 as shown in FIG. 6.

The operations may end, at which point the control logic 800 may be repeated.

Figure 9:
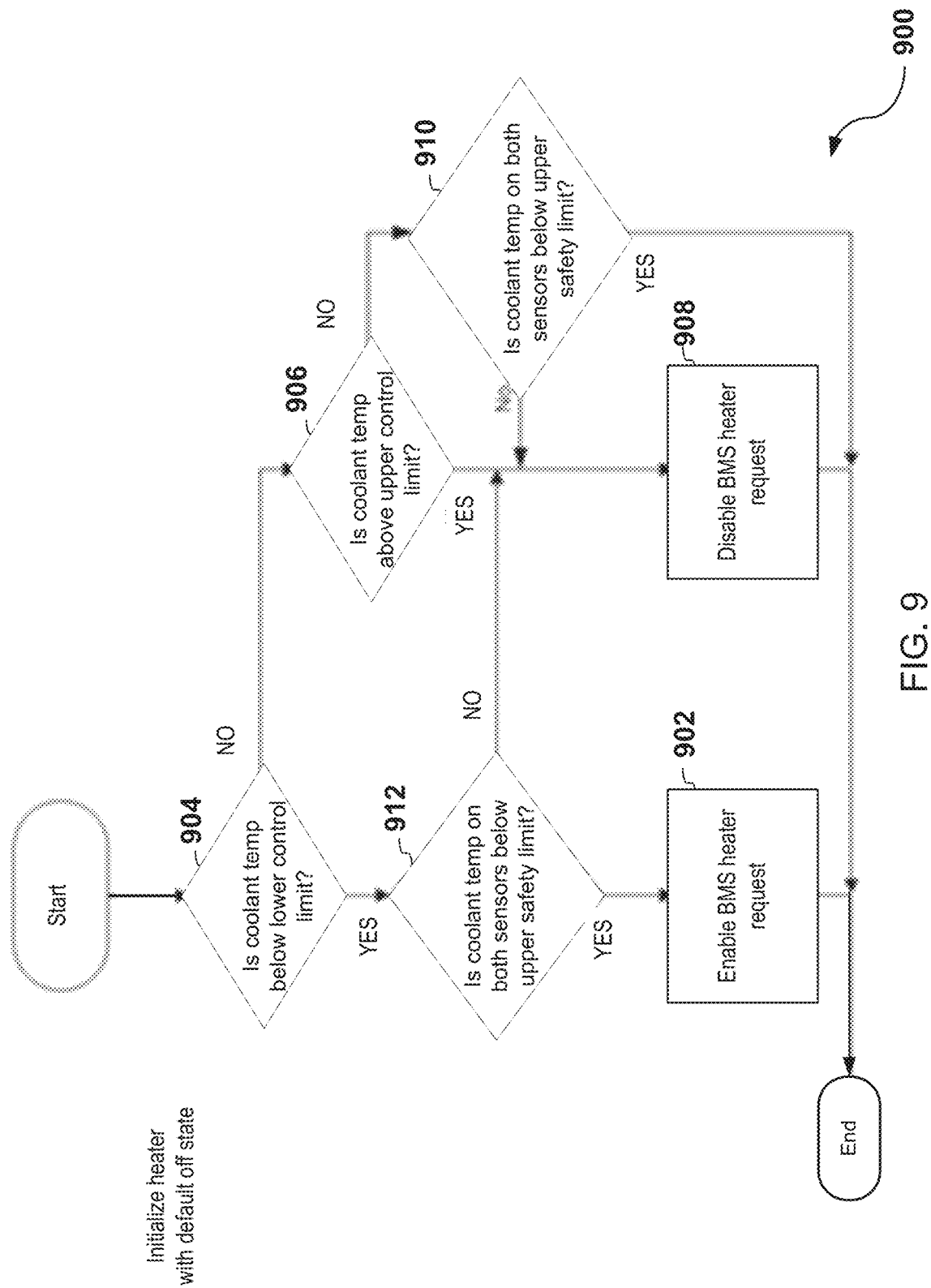
FIG. 9 illustrates an example of control logic of an energy storage monitoring system.

FIG. 9 illustrates an example of control logic 900 of the BMS 242. The control logic 900 may include additional, fewer, and/or different operations than in the illustrated example. In addition, the operations may be performed in a different order than illustrated.

In the illustrated example, the control logic 900 of the BMS 242 includes a number of checks to pass before sending (902) the BMS heater request to the HVDC controller 252. The BMS heater request is any message giving permission to the HVDC controller 252 (or to any other controller) to turn on the in-line heater 308. An example of the BMS heater request is the "heater enable" bit described above, where the bit corresponds to an "enable" indication.

Operations may begin by checking (904) if the temperature of the thermal management fluid is below a lower control limit. If not, operations may proceed to checking (906) if the temperature of the thermal management fluid is above an upper control limit. If the temperature is above the upper control limit, the disable BMS heater request is sent (908) to the HVDC controller 252. The disable BMS heater request is any message denying permission to the HVDC controller 252 (or to any other controller) to turn off the in-line heater 308. An example of the BMS heater request is the "heater enable" bit described above, where the bit corresponds to a "disable".

Alternatively, if the temperature of the thermal management fluid is not above the upper control limit, then the temperature is between the lower control limit and the upper control limit, and operations continue by checking (910) if the temperature of the thermal management fluid at the inlet to the ESS 232 and at the outlet of the ESS 232 (measured by the sensors 316 and 318) remain below an upper safety limit. If the temperature is below the upper safety limit, then neither the enable BMS heater request nor the disable BMS heater request is sent. However, if the temperatures are not below the upper safety limit, then the disable BMS heater request is sent (908).

If the temperature of the thermal management fluid is found to be below the lower control limit when checked (904), operations may proceed to checking (912) if the temperature of the thermal management fluid at the inlet to the ESS 232 and at the outlet of the ESS 232 (measured by the sensors 316 and 318) remain below an upper safety limit. If the temperatures are below the upper safety limit, operations may proceed by sending (902) the BMS heater request to the HVDC controller 252. Alternatively, if either of the temperatures are not below the upper safety limit, then the disable BMS heater request is sent (908).

The operations may end, at which point the control logic 900 may be repeated.

As explained above, the example of the control logic 900 of the BMS 242 illustrated in FIG. 9 checks (904, 906, 910, 912) if the temperature of the thermal management fluid is outside of predetermined limits. The temperature is measured by the sensors 316 and 318. Alternatively, or in addition, the control logic 900 of the BMS 242 may check (904, 906, 910, 912) if the temperature obtained from the temperature sensors 314 monitoring battery cell temperatures or, more generally, temperatures of the energy source device are outside of predetermined limits.

Figure 10:
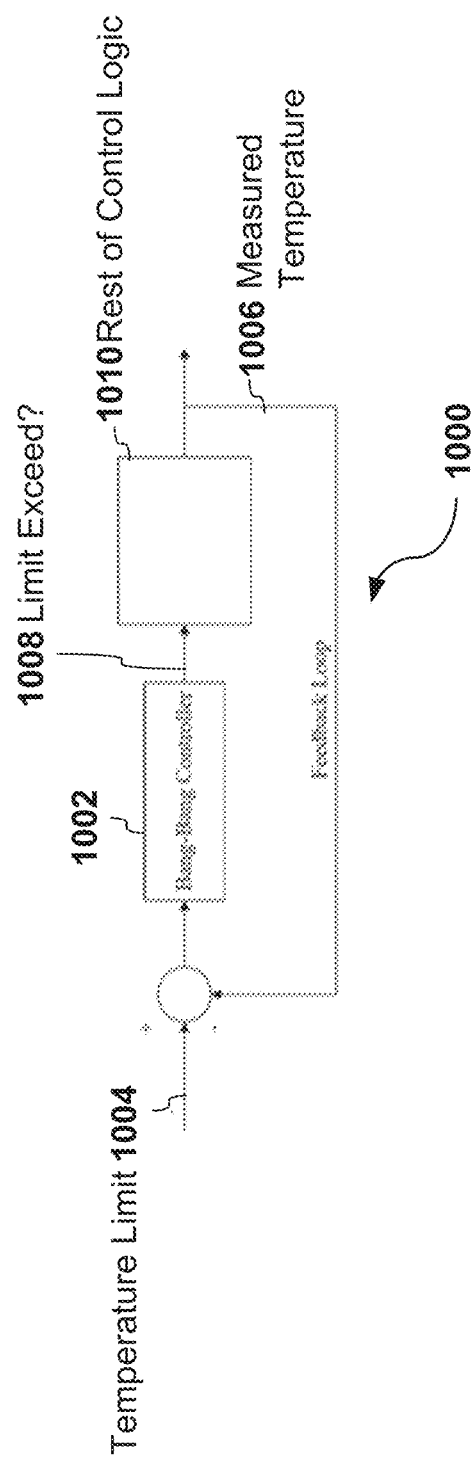
FIG. 10 illustrates an example of a limit comparison circuit that uses hysteresis to avoid continually switching an in-line heater on and off.

The temperature control aspect of the control logic 900 may use a degree of hysteresis to prevent the HVDC controller 252 from continually switching the in-line heater 308 on and off. FIG. 10 illustrates an example of a limit comparison circuit 1000 that uses hysteresis to avoid continually switching the in-line heater 308 on and off.

The limit comparison circuit 1000 includes a bang-bang controller 1002. The bang-bang controller 1002 is a controller which outputs only two discrete values. The difference between a temperature limit 1004 and a measured temperature 1006 is provided as an input to the bang-bang controller 1002. An output 1008 of the bang-bang controller 1002 is a binary value indicating whether the temperature limit 1004 is exceeded. The output 1008 may be supplied to the rest 1010 of the control logic. Examples of the temperature limit 1004 include an upper set point (USP) and a lower set point (LSP). Examples of the measured temperature 1006 may include the temperature of the thermal management fluid at the inlet to the ESS 232 and at the outlet of the ESS 232 measured by the sensors 316 and 318. The limit comparison circuit 1000 and the rest 1010 of the control logic may be included in, for example, the control logic 900 of the BMS 242.

The upper set point may be the highest output with hysteresis, giving the highest desired operating temperature at which the in-line heater 308 will switch off. The upper set point is the same as the upper control limit mentioned above.

The lower set point may be the lowest output with hysteresis, giving the lowest desired operating temperature at which the in-line heater 308 is to switch on. The lower set point is the same as the lower control limit mentioned above.

Figure 11:
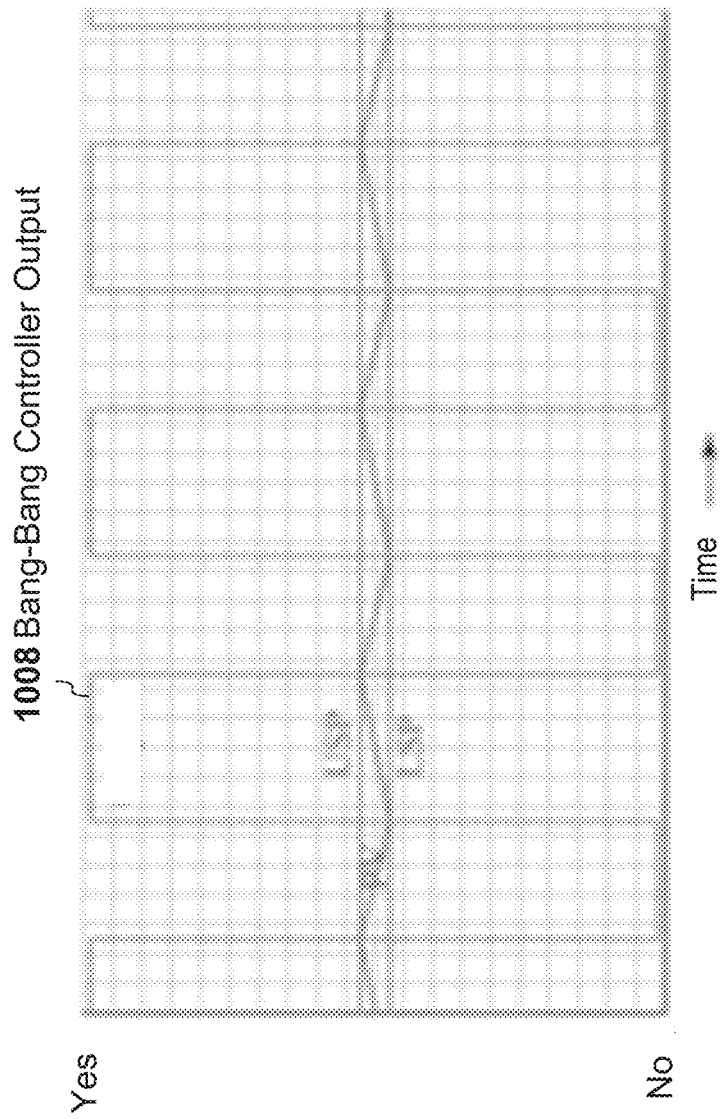
FIG. 11 illustrates an example of the output of a bang-bang controller relative to a temperature limit and a measured temperature.

FIG. 11 illustrates an example of the output 1008 of the bang-bang controller 1002 relative to the temperature limit 1004 (such as the USP or the LSP) and the measured temperature 1006 (designated PV in FIG. 11).

Figure 12:
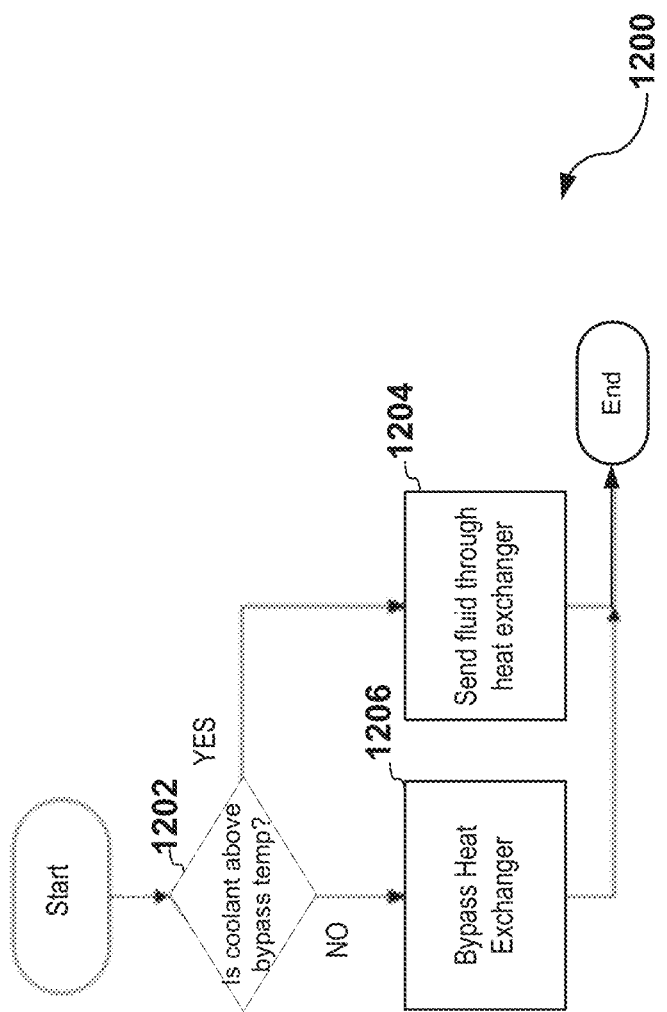
FIG. 12 illustrates an example of control logic for a thermal bypass valve.

FIG. 12 illustrates an example of control logic 1200 for the thermal bypass valve 326. The control logic 1200 may include additional, fewer, and/or different operations than in the illustrated example. In addition, the operations may be performed in a different order than illustrated.

In the illustrated example, operations begin by checking (1202) if the temperature of the thermal management fluid is above a bypass temperature. If temperature is above the bypass temperature, then the thermal bypass valve 326 permits (1204) the thermal management fluid to flow through the heat exchanger 320. Alternatively, if the temperature is not above the bypass temperature, then the thermal bypass valve 326 causes the thermal management fluid to bypass (1206) the heat exchanger 320.

The operations may end, at which point the control logic 1200 may be repeated. The control logic 1200 for the thermal bypass valve 326 may be included in the thermal bypass valve 326. Alternatively, the control logic 1200 may be performed by any of the controllers.

Figure 13:
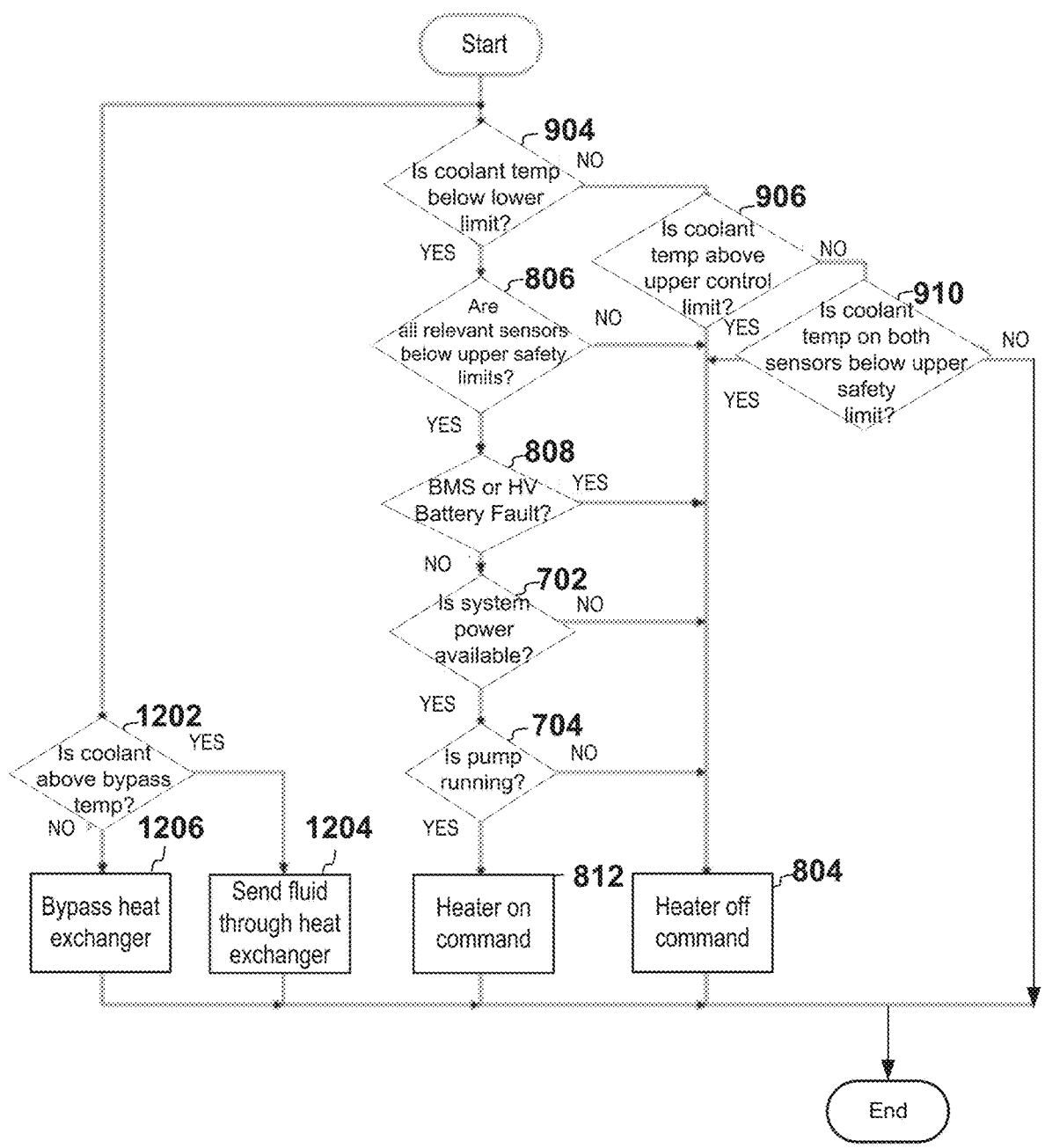
FIG. 13 illustrates an example of the overall logic of a thermal management system for an energy storage system.

FIG. 13 illustrates an example of the overall logic of the thermal management system 260 for the energy storage system 232. As mentioned above, the overall logic may be distributed differently across the controllers than in the previously illustrated examples.

The methods, devices, processing, circuitry, and logic described above may be implemented in many different ways and in many different combinations of hardware and software. Each of the controllers is controller circuitry. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Because each of the controllers is circuitry, the controllers may also be referred to as controller circuitry; for example, the energy storage controller may be referred to as the energy storage controller circuitry.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each feature, unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively, or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical component may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of controlling an in-line heater for an energy storage device, the method comprising: determining a pump is running, wherein when running, the pump circulates a thermal management fluid through a thermal management conditioning loop, which includes the in-line heater and a heat transfer hardware configured to transfer heat between the thermal management fluid and the energy storage device, wherein the in-line heater is in thermal communication with the thermal management fluid; and turning the in-line heater on in response to the determination that the pump is running and a temperature of the thermal management fluid is below a lower control limit.

A second aspect relates to the method of aspect 1, wherein the in-line heater is turned on in response to the pump running, the temperature of the thermal management fluid being below a lower control limit, and a temperature of a waste heat source in thermal communication with the thermal management fluid is below an upper safety limit.

A third aspect relates to the method of the second aspect, wherein the waste heat source includes a power electronics.

A fourth aspect relates to the method of the third aspect, wherein the temperature of the waste heat source is a temperature of heat transfer hardware capable of transferring heat between the thermal management fluid and a power electronic converter included in the power electronics.

A fifth aspect relates to the method of any preceding aspect, wherein the in-line heater is turned on in response to the pump running, the temperature of the thermal management fluid being below a lower control limit, and no fault in a battery management system is detected.

A sixth aspect relates to method of any preceding aspect, wherein the in-line heater is turned on in response to the pump running, the temperature of the thermal management fluid being below a lower control limit, and no fault in a power electronic converter being detected, wherein the power electronic converter is in thermal communication with the thermal management fluid.

A seventh aspect relates to the method of any preceding aspect, wherein the in-line heater is turned on in response to the pump running, the temperature of the thermal management fluid being below a lower control limit, and power is available for the in-line heater.

An eighth aspect relates to the method of any preceding aspect, wherein the in-line heater is turned on in response to the pump running, the temperature of the thermal management fluid being below a lower control limit.

A ninth aspect relates to the method of any preceding aspect, further comprising turning the in-line heater off in response to a determination that the temperature of the thermal management fluid is above an upper safety limit.

A tenth aspect relates to the method of any preceding aspect, further comprising turning the in-line heater off in response to a temperature of a waste heat source in thermal communication with the thermal management fluid not being below an upper safety limit.

An eleventh aspect relates to the method of the tenth aspect, wherein the waste heat source includes a power electronics.

A twelfth aspect relates to the method of the eleventh aspect, wherein the temperature of the waste heat source is a temperature of heat transfer hardware capable of transferring heat between the thermal management fluid and a power electronic converter included in the power electronics.

A thirteenth aspect relates to the method of any preceding aspect, further comprising turning the in-line heater off in response to detection of a fault in a battery management system that includes the energy storage device.

A fourteenth aspect relates to the method of any preceding aspect, further comprising turning the in-line heater off in response to detection of a fault in a power electronic converter being detected, wherein the power electronic converter is in thermal communication with the thermal management fluid.

A fifteenth aspect relates to the method of any preceding aspect, further comprising turning the in-line heater off in response to power not being available for the in-line heater.

A sixteenth aspect relates to the method of any preceding aspect, further comprising turning the in-line heater off in response to power not being available for the pump.

A seventeenth aspect relates to the method of any preceding aspect, further comprising causing the thermal management fluid to bypass a heat exchanger configured to remove heat from the thermal management fluid, wherein the thermal management fluid is caused to bypass the heat exchanger in response to the thermal management fluid being below a bypass temperature. An eighteenth aspect relates to the method of any preceding aspect, wherein the in-line heater is configured to turn itself off in response to the temperature of the thermal management fluid being above an upper control limit.

In addition to the features mentioned in each of the independent aspect enumerated above, some examples may show, alone or in combination, the optional features mentioned in the dependent aspects and/or as disclosed in the description above and shown in the figures.

What is claimed is:

1. A method of controlling an in-line heater for an energy storage device, the method comprising:
   activating, at a first time, a pump;
   determining, at a second time that is after the first time, whether the pump is running, wherein when running, the pump circulates a thermal management fluid through a thermal management conditioning loop, which includes the in-line heater and a heat transfer hardware configured to transfer heat between the thermal management fluid and the energy storage device, wherein the in-line heater is in thermal communication with the thermal management fluid;
   measuring, by a temperature sensor fluidically positioned upstream from the in-line heater, a temperature of the thermal management fluid;
   responsive to determining that the pump is running and that the measured temperature of the thermal management fluid is below a lower control limit, turning, at a third time that is after the second time, the in-line heater on;
   responsive to determining that the measured temperature of the thermal management fluid is above an upper safety limit, turning the in-line heater off;
   cooling, by a heat exchanger positioned fluidically downstream from the energy storage device, the thermal management fluid, wherein the temperature sensor is a first temperature sensor fluidically positioned upstream from the in-line heater and downstream from the heat exchanger that measures a first temperature of the thermal management fluid; and
   measuring, by a second temperature sensor fluidically positioned downstream from the heat transfer hardware and upstream from the heat exchanger, a second temperature of the thermal management fluid, wherein turning the in-line heater off comprises turning the in-line heater off responsive to determining that either the first temperature or the second temperature is above the upper safety limit.

2. The method of claim 1, wherein the in-line heater is turned on in response to the pump running, the temperature of the thermal management fluid being below a lower control limit, and a temperature of a waste heat source in thermal communication with the thermal management fluid is below an upper safety limit.

3. The method of claim 2, wherein the waste heat source includes a power electronics.

4. The method of claim 3, wherein the temperature of the waste heat source is a temperature of heat transfer hardware capable of transferring heat between the thermal management fluid and a power electronic converter included in the power electronics.

5. The method of claim 1, wherein the in-line heater is turned on in response to the pump running, the temperature of the thermal management fluid being below a lower control limit, and no fault in a battery management system is detected.

6. The method of claim 1, wherein the in-line heater is turned on in response to the pump running, the temperature of the thermal management fluid being below a lower control limit, and no fault in a power electronic converter being detected, wherein the power electronic converter is in thermal communication with the thermal management fluid.

7. The method of claim 1, wherein the in-line heater is turned on in response to the pump running, the temperature of the thermal management fluid being below a lower control limit, and power is available for the in-line heater.

8. The method of claim 1, wherein the in-line heater is turned on in response to the pump running, the temperature of the thermal management fluid being below a lower control limit.

9. The method of claim 2, wherein the waste heat source includes a power electronics.

10. The method of claim 9, wherein the temperature of the waste heat source is a temperature of heat transfer hardware capable of transferring heat between the thermal management fluid and a power electronic converter included in the power electronics.

11. The method of claim 1, further comprising turning the in-line heater off in response to detection of a fault in a battery management system that includes the energy storage device.

12. The method of claim 1, further comprising turning the in-line heater off in response to detection of a fault in a power electronic converter being detected, wherein the power electronic converter is in thermal communication with the thermal management fluid.

13. The method of claim 1, further comprising turning the in-line heater off in response to power not being available for the in-line heater.

14. The method of claim 1, further comprising turning the in-line heater off in response to power not being available for the pump.

15. The method of claim 1, further comprising causing the thermal management fluid to bypass a heat exchanger configured to remove heat from the thermal management fluid, wherein the thermal management fluid is caused to bypass the heat exchanger in response to the thermal management fluid being below a bypass temperature.

16. The method of claim 1, wherein the in-line heater is configured to turn itself off in response to the temperature of the thermal management fluid being above an upper control limit.

17. A computer-readable storage medium storing instructions that, when executed, cause one or more processors to:
   activate, at a first time, a pump;
   determine, at a second time that is after the first time, whether the pump is running, wherein when running, the pump circulates a thermal management fluid through a thermal management conditioning loop, which includes an in-line heater and a heat transfer hardware configured to transfer heat between the thermal management fluid and an energy storage device, wherein the in-line heater is in thermal communication with the thermal management fluid;
   measure, via a first temperature sensor fluidically positioned upstream from the in-line heater, a temperature of the thermal management fluid;
   responsive to determining that the pump is running and that a temperature of the thermal management fluid is below a lower control limit, turn on, at a third time that is after the second time, the in-line heater;
   responsive to determining that the measured temperature of the thermal management fluid is above an upper safety limit, turn off the in-line heater; and
   measure, by a second temperature sensor fluidically positioned downstream from a heat transfer hardware and upstream from the heat exchanger, a second temperature of the thermal management fluid, wherein the instructions that cause the one or more processors to turn the in-line heater off comprise instructions that cause the one or more processors to turn the in-line heater off responsive to determining that either the first temperature or the second temperature is above the upper safety limit, wherein the first temperature sensor is fluidically positioned upstream from the in-line heater and downstream from the heat exchanger that measures a first temperature of the thermal management fluid, and wherein the heat exchanger is positioned fluidically downstream from the energy storage device and cools the thermal management fluid.

18. A method of controlling an in-line heater for an energy storage device, the method comprising:
   activating, at a first time, a pump;
   determining, at a second time that is after the first time, whether the pump is running, wherein when running, the pump circulates a thermal management fluid through a thermal management conditioning loop, which includes:
   the in-line heater;
   a first heat transfer hardware configured to transfer heat between the thermal management fluid and the energy storage device; and
   a second heat transfer hardware configured to transfers heat between the thermal management fluid and a power electronic converter, wherein the in-line heater is in thermal communication with the thermal management fluid and is located on a bypass line of the thermal management conditioning loop that bypasses the second heat transfer hardware; and
   responsive to determining that the pump is running and that a temperature of the thermal management fluid is below a lower control limit, turning, at a third time that is after the second time, the in-line heater on.

* * * * *